United States Patent [19]

Otsuka et al.

[11] Patent Number: 4,997,029

[45] Date of Patent: Mar. 5, 1991

[54] AIR CONDITIONING APPARATUS

[75] Inventors: Nobuo Otsuka, Kamakura, Japan; Peter F. Thompson, Cypress, Calif.; Toyohiro Kobayashi; Yasuo Sato, both of Shizuoka, Japan

[73] Assignee: Mitsubishi Denki Kabushiki Kaisha, Tokyo, Japan

[21] Appl. No.: 453,106

[22] Filed: Dec. 14, 1989

[30] Foreign Application Priority Data

Dec. 27, 1985 [JP] Japan ................................ 60-296231

[51] Int. Cl.⁵ ...................... G05D 23/00; F24F 3/044; F25B 29/00
[52] U.S. Cl. ......................................... 165/12; 165/22; 165/11.1; 236/46 R; 236/51; 236/94
[58] Field of Search ............................ 165/11.1, 12, 22; 236/46 R, 51, 94, 49.3, 47; 364/557

[56]  References Cited

U.S. PATENT DOCUMENTS

| | | | |
|---|---|---|---|
| 4,136,732 | 1/1979 | Demaray et al. | 165/22 |
| 4,200,910 | 4/1980 | Hall | 165/22 |
| 4,217,646 | 8/1980 | Caltagirone et al. | 165/22 |
| 4,235,368 | 11/1980 | Neel | 236/94 |
| 4,264,034 | 4/1981 | Hyltin et al. | 236/46 R |
| 4,287,939 | 9/1981 | Pohl et al. | 236/94 |
| 4,308,991 | 1/1982 | Peinetti et al. | 165/12 |
| 4,316,577 | 2/1982 | Adams et al. | 165/12 |
| 4,319,711 | 3/1982 | Barker et al. | 165/12 |
| 4,442,972 | 4/1984 | Sahay et al. | 165/12 |
| 4,446,913 | 5/1984 | Krocker | 165/12 |
| 4,460,125 | 7/1984 | Barker et al. | 236/94 |
| 4,473,109 | 9/1984 | Kojima et al. | 165/22 |
| 4,487,363 | 4/1984 | Parker et al. | 165/22 |
| 4,530,395 | 7/1985 | Parker et al. | 165/22 |
| 4,606,401 | 8/1986 | Levine et al. | 165/12 |
| 4,646,964 | 3/1987 | Parker et al. | 165/11.1 |
| 4,674,291 | 6/1987 | Kitauchi | 236/94 |

FOREIGN PATENT DOCUMENTS

| | | | |
|---|---|---|---|
| 57-44335 | 3/1982 | Japan . | |
| 60-8581 | 3/1985 | Japan . | |
| 0233438 | 11/1985 | Japan | 236/38 |
| 8400624 | 2/1984 | World Int. Prop. O. . | |

Primary Examiner—John Ford

[57] ABSTRACT

An air conditioning apparatus of a VAV system has a main controller which comprises an operation mode changing means, a temperature schedule inputting means for inputting data for warming or cooling each of the rooms in accordance with a program, and a room controller having a set room temperature changing means for changing a set room temperature for each of the rooms. The program can be easily changed by operating the controllers so as to meet the life pattern of a resident. The air conditioning apparatus provides advantages of saving energy and comfortableness.

2 Claims, 9 Drawing Sheets

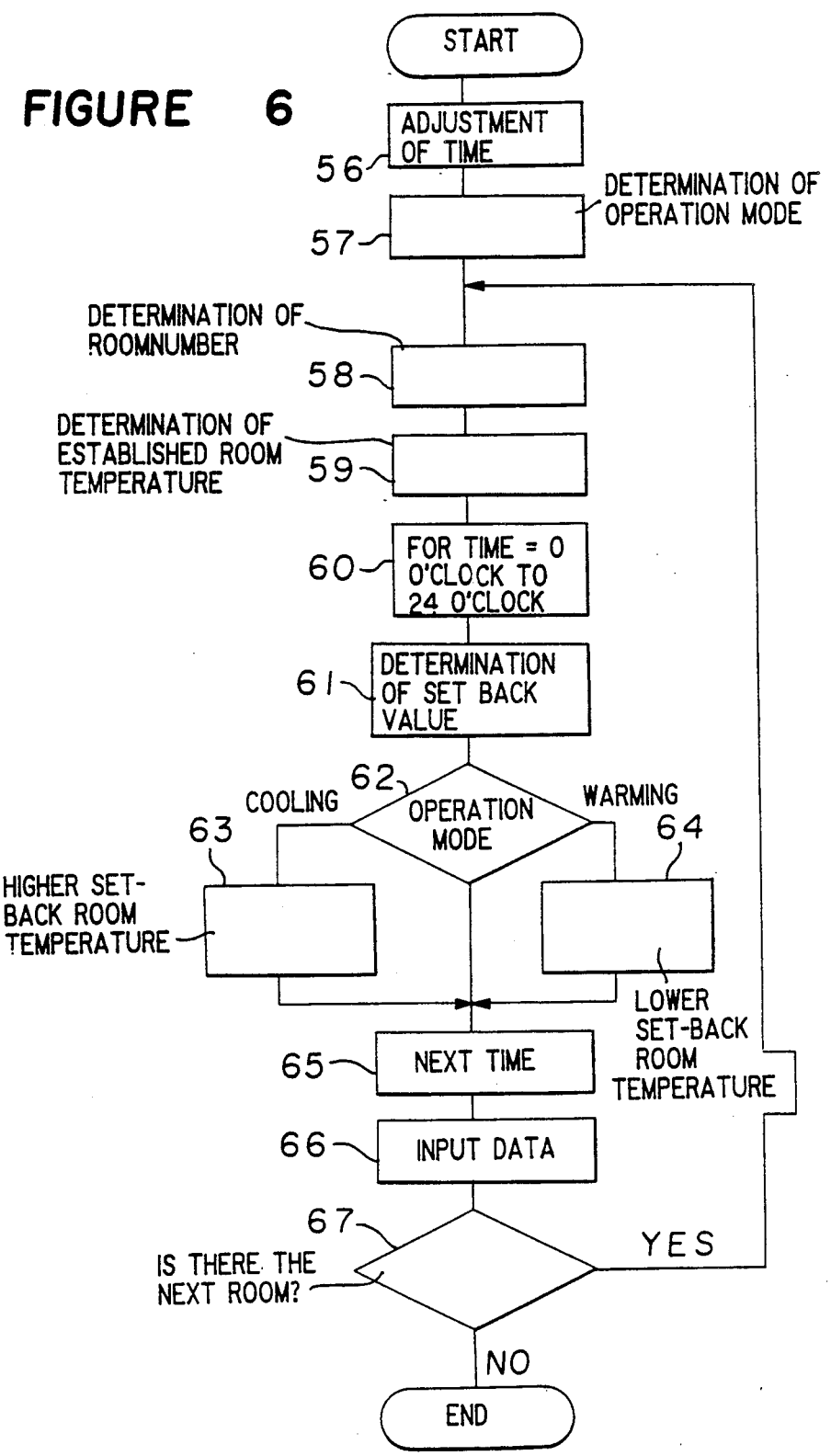

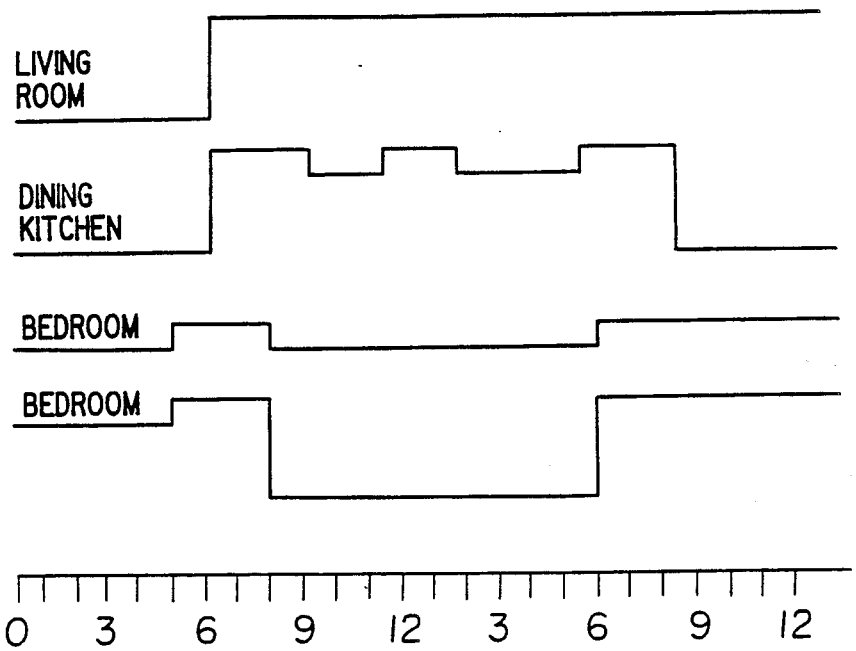
FIGURE 7    TEMPERATURE SCHEDULE (ROOM HEATING OPERATION)
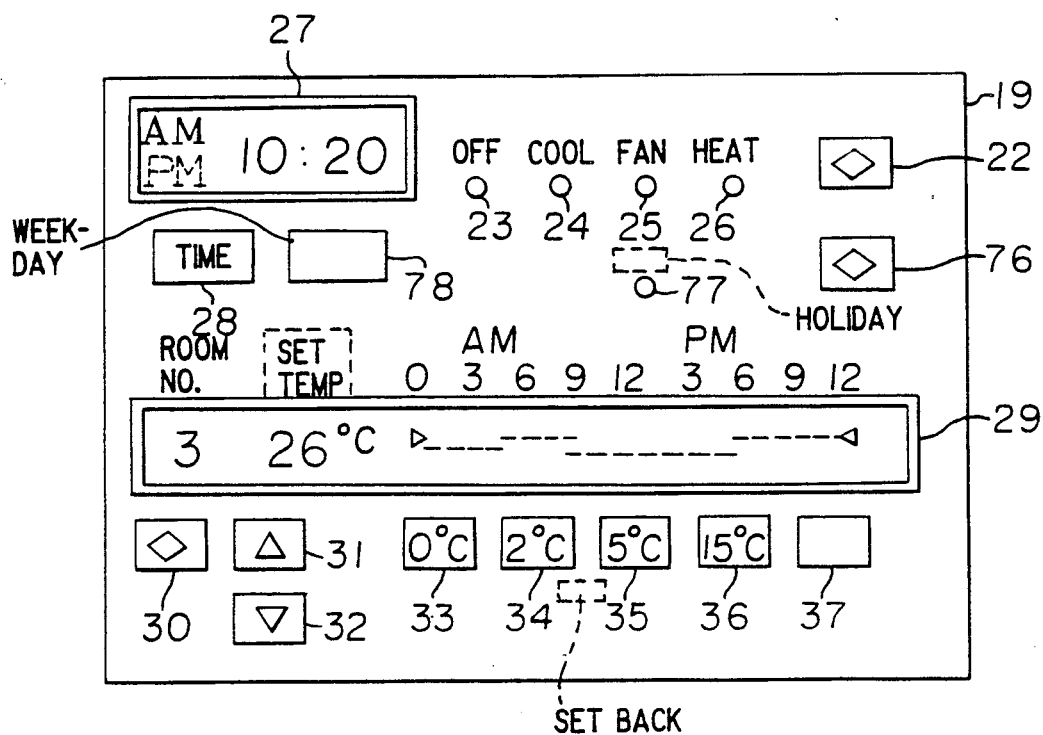
FIGURE 8

AIR CONDITIONING APPARATUS

This application is a division of application Ser. No. 07/258,04 filed on Oct. 17, 1989, now abandoned, which is a continuation of Ser. No. 947,290 filed on 12/29/86, now abandoned.

BACKGROUND OF THE INVENTION

1. Field of the Invention

The present invention relates to a duct type air conditioning apparatus which utilizes a variable air quantity control system capable of regulating temperature in each room independently of the other. Particularly, it relates to the duct type air conditioning apparatus having a controller in which a temperature schedule and other programs are inputted.

2. Discussion of Background

There has so far been known a centralized air-conditioning system which carries out air conditioning by distributing temperature-regulated air to each room through air duct. The conventional air conditioning system has various meritorious effects in comparison with a heat pump chiller/fan coil system, a package air-conditioner decentralized arrangement system and others from the viewpoint that it can easily incorporate a humidifier, a high performance filter, an external air introducing system and a total heat-exchanger, hence it is able to perform a high grade air conditioning operation. It can utilize the room space with high effectiveness because it is sufficient to form an outlet port and an intake port for the room to be air-conditioned, and it has the least disorder in its heat transporting system Therefore, such central air conditioning system has been used widely for the air conditioning of a large-sized building. Of various central air conditioning systems, the variable air quantity control system capable of carrying out the energy-saving operations (hereinafter, referred to as "VAV system") is capable of controlling temperature in a plurality of rooms, each having different heat load, independently of the other, is capable of stopping the air-conditioning operation in those rooms which are not in use, is also able to reduce the running cost of the air conditioning system by changing the power for the air blower in accordance with quantity of air to be blown out, and, at the same time is able to decrease the capacity of the heat source device by taking into consideration of the rate of its use.

There are several types in the VAV system. As one system, there is a system which uses a throttle type VAV unit, in which pressure in the duct which varys depending on the degree of opening of the dampers is detected, and the capacity of the air blower is controlled so as to bring the value of pressure to a certain predetermined level. Therefore, when the heat load in the room decreases (even when the air quantity becomes small, the temperature of the air within the duct is controlled at a constant level), the required performance of the heat source device becomes small and the power for the air blower is also decreased.

As conventional techniques adopting the throttle type VAV unit, there are known those as in the Japanese Examined Pat. Publication No. 47497/1985 and as shown in FIG. 2.10a in Manual of Refrigeration and Air-conditioning (new fourth edition, technique for application) published by Nippon Reito Kyokai.

FIG. 13 is a diagram showing the system of the conventional air conditioning apparatus. In FIG. 13, a reference numeral 1 designates rooms to be air-conditioned (in this case, four rooms are to be air-conditioned). A numeral 2 designates a room unit disposed in the ceiling of the building, and which is constructed with an air-filter 3, a heat exchanger 4 and an air blower 5. A main air duct 6 is connected to the air outlet port of the room unit 2, and four branch ducts 7 are diverged from the main air duct 6. A throttle type VAV unit 8 is placed in each of the branch ducts 7. A damper 9 is turnably fitted within each of the VAV unit 8, and which is driven by a stepping motor (not shown). An outlet port 10 is provided at the end part of the branch duct 7. An inlet port 11 is provided at the lower part of a door in the room 1. An inlet port 12 is formed in the ceiling board above the corridor. An inlet duct 13 connects the inlet port 12 of the ceiling to the air inlet port of the room unit 2. A room controller 14 is attached to each of the rooms 1. A temperature detector 15 and a pressure detector 16 are disposed in the main air duct 6. A heat source device 17 such as a heat pump is connected to the heat exchanger 4. A controlling apparatus for controlling the operations of the heat source device, the air blower 5 and the dampers 9 is disposed in the ceiling.

In the conventional air conditioning apparatus having the construction as described above, when a user determines a set room temperature by the room controller 14 placed in each of the rooms, the degree of opening of the dampers is regulated at their optimum positions in accordance with the set room temperature for each room and the current temperature in each of the rooms. Pressure in the main air duct 6 varys depending on the degree of opening of the dampers 9. The pressure is detected by the pressure detector 16, and the capacity of the air blower 5 is changed so that a pre-determined established pressure is given. When the quantity of air blown is changed, the temperature of air at the outlet of the heat exchanger 4 is also changed. The temperature of the air is detected by the temperature detector 15 whereby the performance of the heat source device 17 is controlled so that a predetermined temperature of the air is given. Thus, the air regulated at a substantially constant temperature is blown into the rooms at flow rates depending on the magnitude of the heat load in each of the rooms. After the air-conditioning, the air in the rooms flows through the inlet port 11, the corridor, the inlet port 12 formed in the ceiling and the inlet duct 13 to be returned to the room unit 2. Such a series of control is carried out in the optimum manner by means of the controlling apparatus 18 so as to satisfy energy-saving and comfortableness on the basis of the detecting signals from the room controllers 14, the temperature detector 15, the pressure detector 16 and the various detectors (not shown) in the heat source device 17.

In the conventional air conditioning apparatus, however, a controlling operation in which the energy-saving and comfortableness are both satisfied has been insufficient. The reason is as follows. The conventional air conditioning apparatus adopting the VAV system has been used mainly for office buildings. In this case, the air conditioning apparatus is operated in the daytime in which each room is air-conditioned under substantially equal temperature condition, and its operation is stopped in holidays such as the weekends Accordingly, the function to adjust the air quantity by the VAV unit is merely to maintain a room temperature in each of the rooms at constant level by increasing or decreasing the flow rates depending on the heat loads changing due to the orientation of the rooms, the number of persons in the rooms and so on. In the conventional air conditioning apparatus, a program for operating the apparatus in given time zones and the stop of the operation in holidays is given to the controlling apparatus 18. In this case, the operation of air-conditioning for the room which is not in use can be stopped by the room controllers in the rooms.

There are many problems in the conventional air conditioning apparatus using the VAV system when it is applied to a private house. While energy can be greatly reduced by suitably controlling the apparatus, comfortableness for living may be impaired, or the operation of the apparatus becomes complicated and troublesome. For houses in U.S.A., duct type centralized air-conditioning systems are widely used. However, an air conditioning apparatus with automatic control of the VAV system is not practically used, and what is proposed is such a type that the degree of opening of the dampers is adjusted manually or by use of thermostats, or a set back value is used in certain time zones for a set temperature for the total system by using a timer. In the specification, "set back" means that when room warming operation is carried out, the set room temperature is shifted to a slightly lower value in the period of certain time, and when room cooling operation is carried out, it is shifted to a slightly higher level, thereby to save energy.

The conventional air conditioning apparatus is usually operated for all day and for all rooms. However, increase in the cost of energy in the recent years has increased the economic burden of the users and therefore, a system capable of saving energy is expected. Even though the conventional system accomplishes some amount of energy-saving by using the set back values, it can not greatly reduce the energy because of the lack of the function of a zoning control (namely, feeding of air is stopped to a room which does not require the air-conditioning). Further, the conventional air conditioning apparatus has the problems that it is troublesome to adjust the degree of the dampers, or open and close them by manual operations; efficiency of the apparatus decreases, and noise is increased because control of the capacity of the heat source apparatus and the air blower is not in association with the change of the air-flow rate.

Thus, the air conditioning apparatus adopting the VAV system is considered to be suitable for energy-saving in private houses. In this case, however, a special care is needed to save energy for each room. It is, therefore necessary to use a controller in which temperature schedules for the rooms are inputted. In this case, there is a problem that even though a program of temperature schedule is prepared so as to be in conformity with the life pattern of a family, the daily life is not always coincident with the actual life pattern. Therefore, it is necessary to easily change the program including data initially inputted.

Briefly, the following prior art problems need to be addressed:

(1) A life pattern in the weekdays is different from that in the holidays.

(2) Actual life is not always coincident with the life pattern inputted in the controller.

(3) In the case that a room is frequently opened and closed, the temperature difference between the interior and the exterior of the room should be small, and the temperature in the room should reach a predetermined value as soon as possible (4) The zoning and the setting-back should realize remarkable energy-saving.

(5) The zoning and the setting-back should not impair comfortableness in the room.

(6) Operations of inputting and changing data should be simple.

As a controller used for an air conditioning apparatus for many rooms, there is known one as shown in Japanese Examined Utility Model Publication No. 8581/1985. The proposed air conditioning apparatus is of a type having a refrigerant piping instead of the duct type. In the published air conditioning apparatus, a plurality of room controllers and a main controller which functions as the room controllers are provided Accordingly, a set room temperature of any room can be changed by the main controller However, the air conditioning apparatus is not adapted to input a program for the temperature schedule and it is insufficient from the viewpoint of saving energy.

SUMMARY OF THE INVENTION

It is an object of the present invention to eliminate the disadvantages of the conventional air conditioning apparatus and to provide an air conditioning apparatus of a VAV system with a main controller and room controllers which can be easily operated and satisfies both advantages of energy-saving and comfortableness The present invention is to provide an air conditioning apparatus which comprises a heat source device for producing warm air or cool air, a heat exchanger connected to the heat source device, an air blower placed by the heat exchanger, an air duct which contains the heat exchanger and the air blower and distributes the warm air or the cool air from the heat exchanger to a plurality of rooms, air quantity adjusting dampers, each of which is disposed in a branched duct connected to each of the rooms, a controlling apparatus for controlling the dampers, the heat source device and the air blower, a main controller connected to the controlling apparatus, a room controller provided with a room temperature detector which is connected to the controlling apparatus and is installed in each of the rooms, wherein the main controller is further provided with an operation mode changing means and a temperature schedule inputting means for inputting data for warming or cooling each of the rooms in accordance with a program, and the room controller is further provided with a set room temperature changing means for changing a set room temperature for each of the rooms.

In another aspect, the present invention is to provide an air conditioning apparatus in which the main controller is provided with an operation mode changing means for changing operation modes including a holiday operation mode a temperature schedule inputting means and a timer means for determining a day of the week, and a room controller is provided with a set room temperature changing means.

Further, the present invention is to provide an air conditioning apparatus in which the main controller is provided with an operation mode changing means for changing operation modes including a programed mode and an all-room mode and a temperature schedule inputting means, and the room controller is provided with a set room temperature changing means.

Further, the present invention is to provide an air conditioning apparatus in which the main controller is provided with an operation mode changing means and a temperature schedule inputting means, and the room controller is provided with a set room temperature changing means and an central/local operation selecting means for selecting a programed operation according to the temperature schedule stored in the main controller or a manual operation.

Further, the present invention is to provide an air conditioning apparatus in which the main controller is provided with an operation mode changing means and a temperature schedule inputting means, and the room controller is provided with a set room temperature changing means and an operation/stop selecting means to select either the operation or the stop of air-conditioning of the rooms.

BRIEF DESCRIPTION OF THE DRAWINGS

FIGS. 1 through 7 show a first embodiment of the air conditioning apparatus according to the present invention;

FIG. 1 is a diagram showing the entire construction of the air conditioning apparatus;

FIG. 2 is a front view of an embodiment of the main controller used for the first embodiment;

FIG. 3 is a front view of an embodiment of the room controller used for the first embodiment;

FIG. 4 is a diagram showing an embodiment of the inner circuit of the main controller;

FIG. 5 is a diagram showing an embodiment of the inner circuit of the room controller;

FIG. 6 is a flow chart showing the steps for the operations of the main controller;

FIG. 7 is a diagram showing an example of a temperature schedule to be inputted into the main controller;

FIG. 8 is a front view of the main controller according to the second embodiment of the present invention;

Preferred embodiments of the present invention will be described in detail with reference to the drawings.

DETAILED DESCRIPTION OF THE EMBODIMENTS

An operation mode changing means used in the present invention is adapted to control the operations of a heat source device, an air blower and dampers and so on through a controlling apparatus.

A temperature schedule inputting means is adapted to input a signal indicative of a set room temperature as a reference value and to input an optional or fixed set back value at each time of 0 o'clock to 24 o'clock A set room temperature changing means changes a set room temperature in the room independently of the temperature schedule inputting means. When the set room temperature (reference temperature) is changed by the operation of both the set room temperature changing means and the temperature schedule inputting means, a value given by the either means which has been operated later is dominant. The set back value inputted through the temperature schedule inputting means is in association with the operation mode changing means in such a manner that when the cooling operation is carried out, the set back value assumes a higher temperature level, and when the room warming operation is carried out, it assumes a lower room temperature level automatically.

A timer means is to correct the set back value in the daytime zones to be zero when it operates in a holiday.

The operation mode changing means corrects the set back value in the daytime zones to be zero and clears the holiday mode at zero o'clock.

The operation mode changing means, when the all-room mode operation is carried out, controls the set temperatures in all rooms to be at a reference temperature inputted by the temperature schedule inputting means or by the set room temperature changing means until the all-room mode operation is changed to the programed mode.

A central/local operation selecting means operates in a such a manner that when the central operation mode is selected, the room temperature of a room is controlled in accordance with a program inputted by the temperature schedule inputting means, and when the local operation mode is selected, the room temperature is controlled to be a constant value (set room temperature) until the local operation mode is changed to the central operation mode.

An operation/stop selecting means is to temporally stop the air-conditioning of the room.

Figure 13:
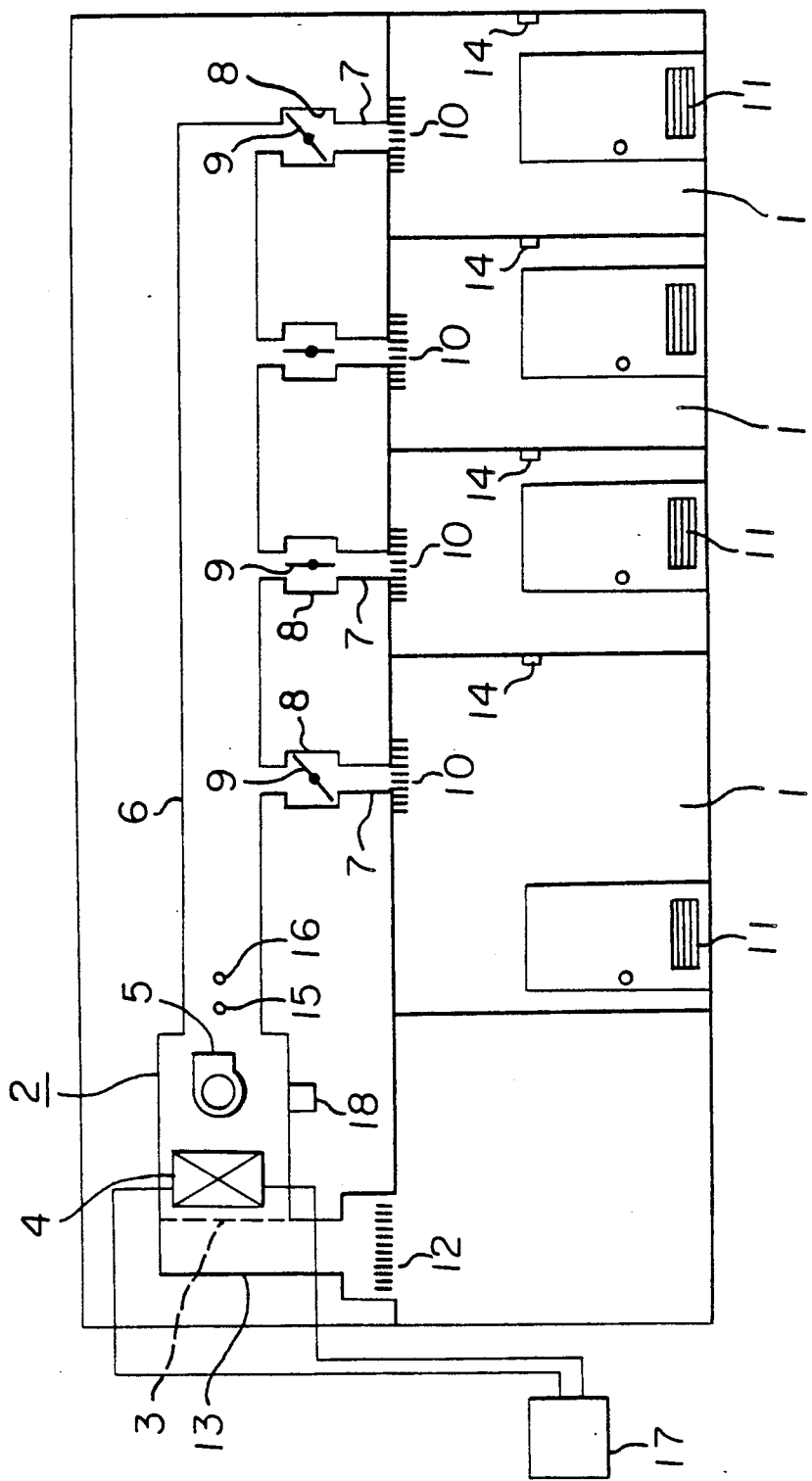
FIG. 13 is a diagram showing a conventional air conditioning apparatus.
Figure 14:
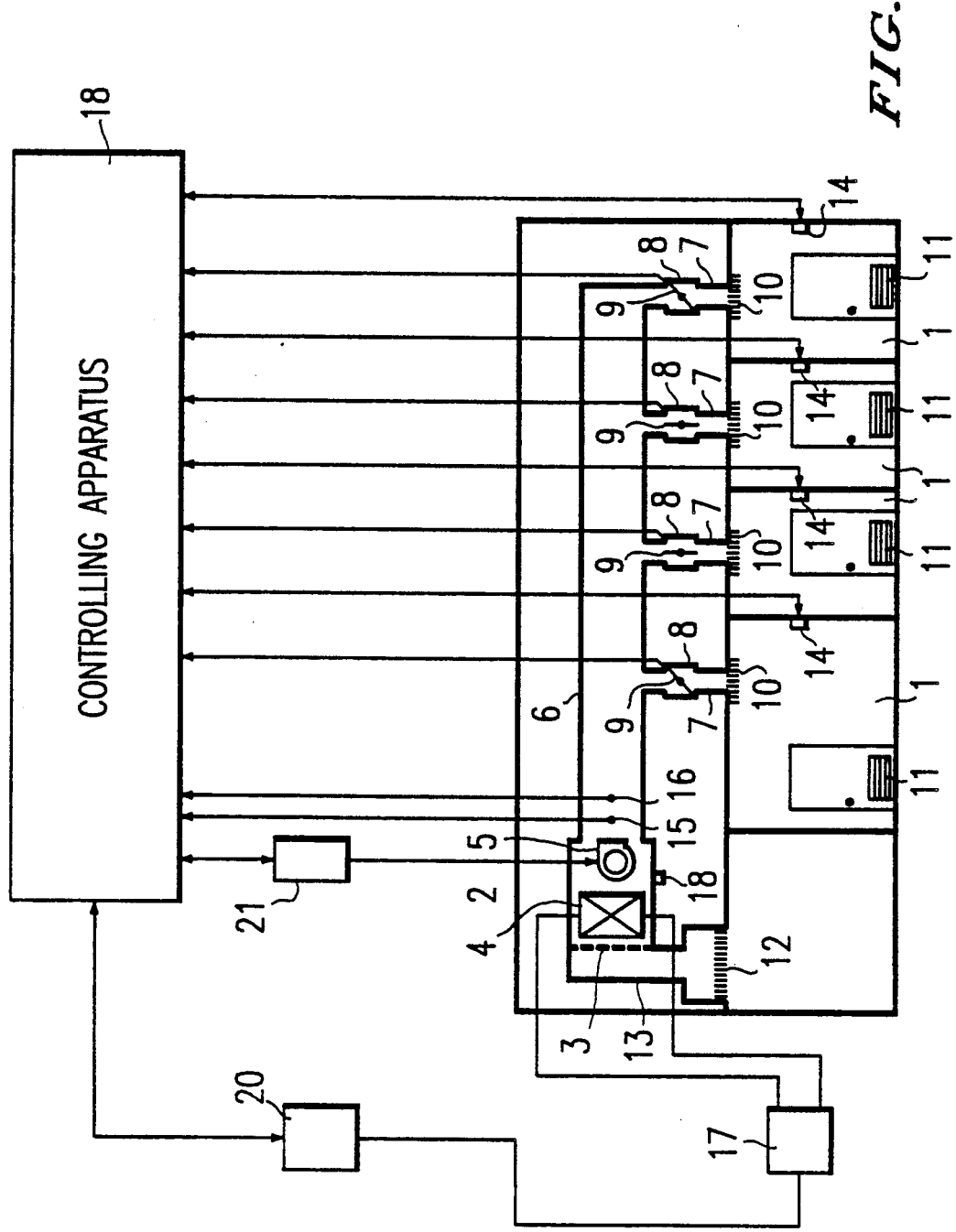
FIG. 14 is a diagram showing the connection of the electrical portions of the first embodiment to a air conditioning apparatus.

In the following, the first embodiment of the present invention will be described with reference to FIGS. 1 to 7 in which the general construction of the air conditioning apparatus is basically the same as that shown in FIG. 13.

Figure 1:
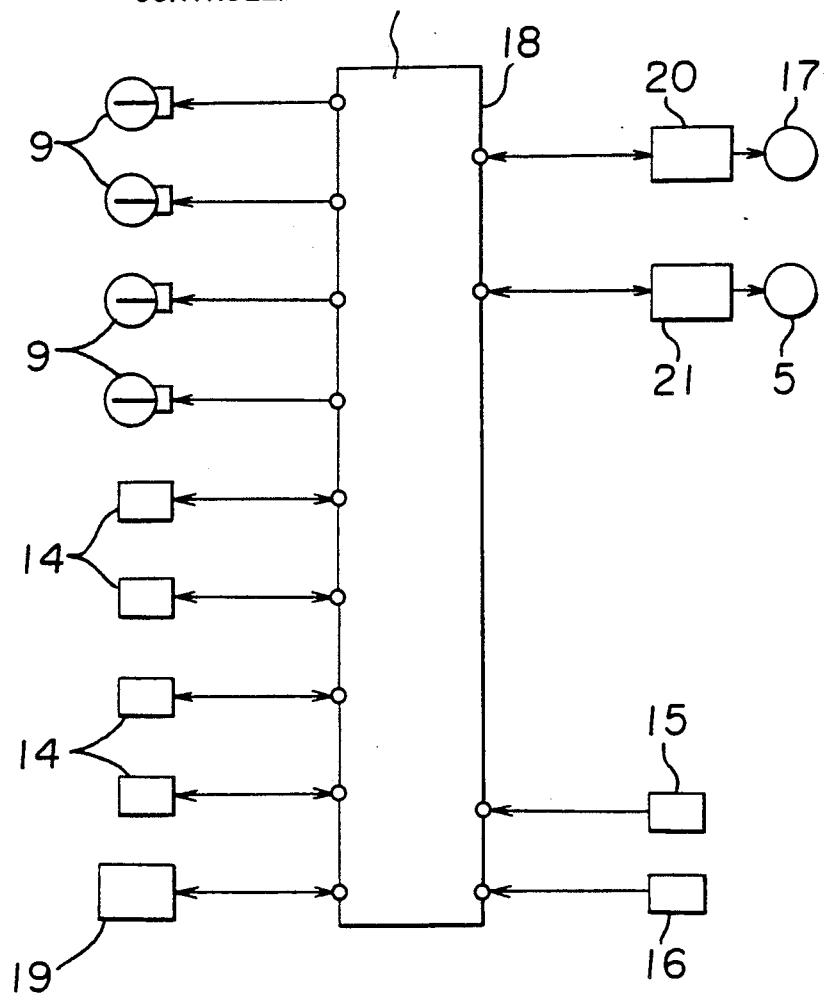

In FIG. 1 showing a diagram of connection of electric parts, a main controller 19 is connected to a controlling apparatus 18 to determine an operation mode and to establish a program on a temperature schedule for the rooms. Four room controllers 14, four dampers 9, a temperature detector 15 and a pressure detector 16 are connected to the controlling apparatus 18. Further, a heat source controlling apparatus which performs capacity control and operation control for a heat source device 17 such as a heat pump and an air blower controlling apparatus 21 which performs capacity control for the air blower 5 are connected to the controlling apparatus 18.

A microcomputer is installed in each of the controlling apparatus 18, the main controller 19, the room controllers 14, the heat source device controlling apparatus 20 and the air blower controlling apparatus 21 so as to be able to transmit data held in these apparatus under multiplex transmission.

In this case, the controlling apparatus 18 is preferably used as a parent machine to supervise the data signals. It is possible to construct the controlling apparatus 18, the heat source device controlling apparatus 20 and the air blower controlling apparatus 21 in one piece.

Figure 2:
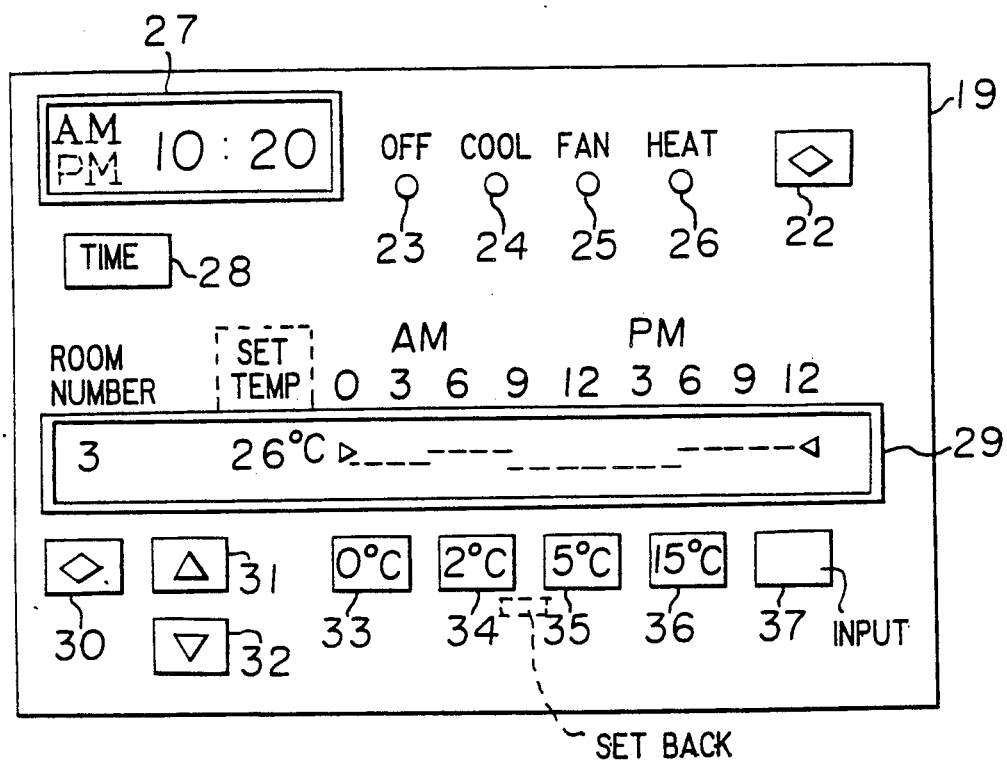
Figure 3:
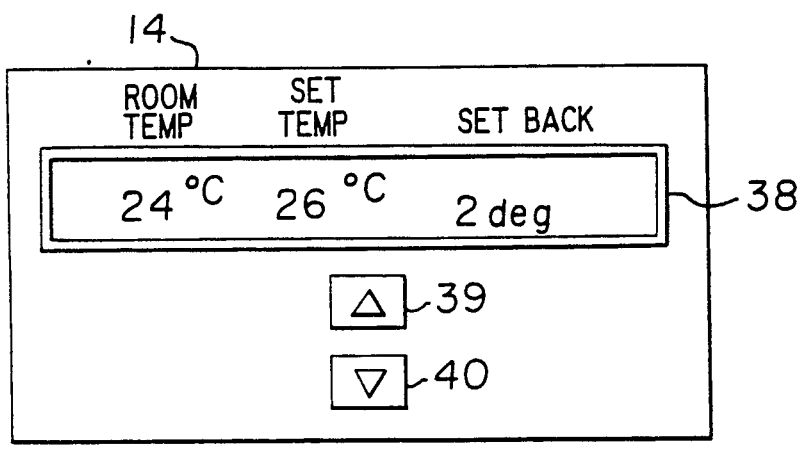

FIG. 2 is a front view of the main controller 19. In FIG. 2, a reference numeral 22 designates an operation mode key which functions as the operation mode changing means, numerals 23 to 26 designate light emitting diodes (LEDs for displaying "OFF" mode, "COOL" mode, "FAN" mode and "HEAT" mode which are related to the operation mode key 22. A numeral 27 designates a liquid crystal display (LED) type time indicator, a numeral 28 designates a time key for setting time, which corresponds to the time indicator 27, a numeral 29 designates a liquid crystal display type temperature indicator capable of displaying a room number, a set room temperature and a temperature schedule, numerals 30 to 37 designate input keys as the temperature schedule inputting means which corresponds to the temperature indicator 29, which comprise a room key 30, a set room temperature raising key 31, a set room temperature lowering key 32, a 0° C. set back key 33, a 2° C. set back key 34, a 5° C. set back key 35 and 15° C. set back key 36, and an input key for inputting the data given by the operations of the keys 33 to 36 into a memory FIG. 3 is a front view of the room controller 14. In FIG. 3, a numeral 38 designates a temperature indicator comprising LCDs which display a room temperature at the current time, a set room temperature and the set back value currently effective. Numerals 39 and 40 designate keys as the set room temperature changing means which is related to the temperature indicator 38, and a numeral 40 designates a set room temperature lowering key. The temperature indicator 38 may be so constructed that a set back absolute temperature is used instead of the set back value (differential temperature with respect a set temperature.

Figure 4:
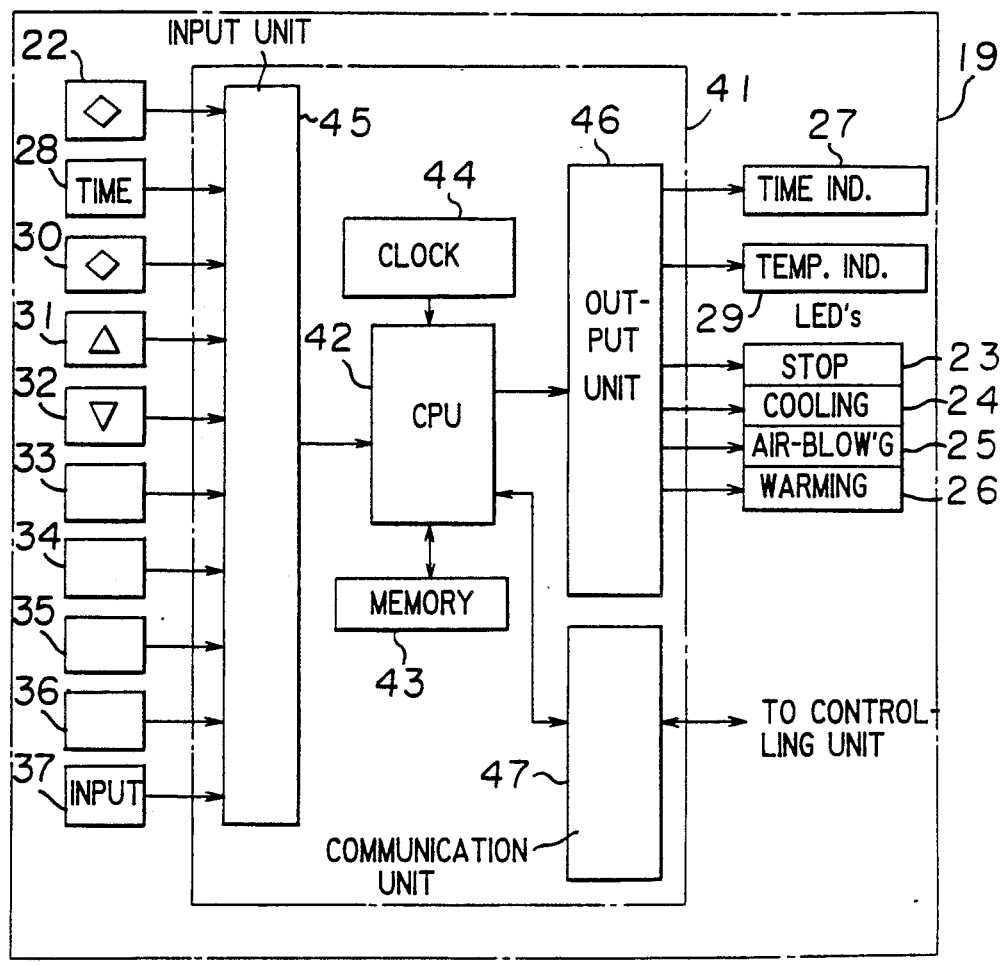

FIG. 4 shows a diagram of the inner circuit of the main controller 19. In FIG. 4, a numeral 41 designates a microcomputer comprising a CPU 41, a memory 43, a clock 44, an input unit 45, an output unit 46 and a communication unit 47. The keys 22, 28 and 30 to 37 as described above are connected to the input unit 45, and the indicators 23 to 27 and 29 as described above are connected to the output unit 46. The communication unit 47 is connected to the controlling apparatus 18.

Figure 5:
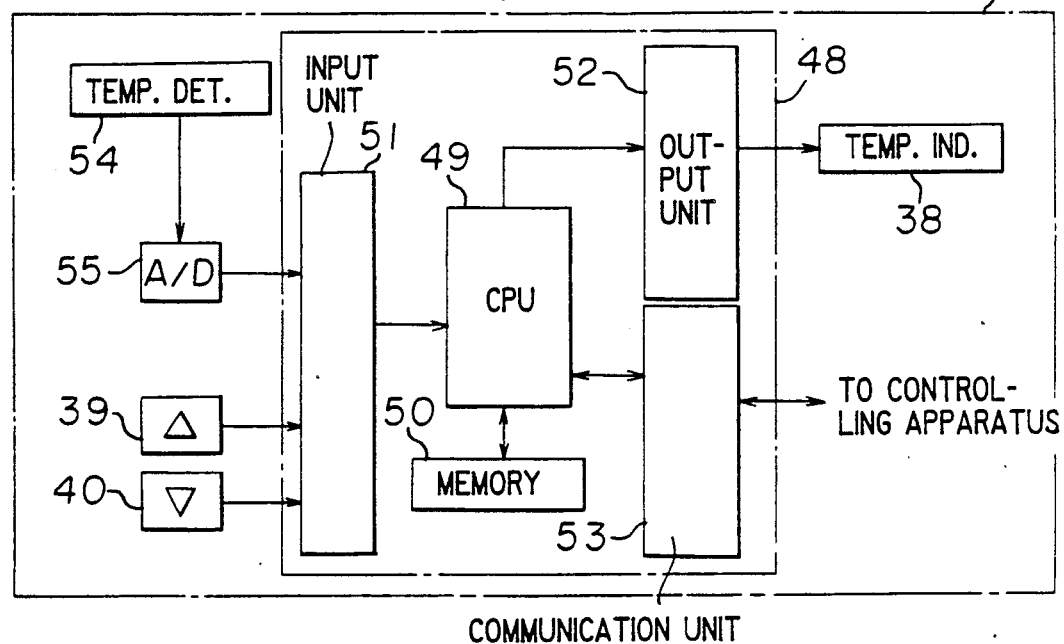

FIG. 5 shows a diagram of the inner circuit of the room controller 14. In FIG. 5, a numeral 48 designates a microcomputer comprising a CPU 49, a memory 50, an input unit 51, an output unit 52 and a communication unit 53. A room temperature detector 54 such as a thermister is connected to the input unit 51 through an A/D transducer 55. The set room temperature raising and lowering keys 39 and 40 are connected to the input unit 51, and the temperature indicator 38 is connected to the output unit 52. The communication unit 53 is connected to the controlling apparatus 18.

The operation of the first embodiment will be described with reference to FIGS. 6 and 7 in which FIG. 6 is a flow chart showing the steps for the operation of the main controller 19, and FIG. 7 is a diagram showing an example of the temperature schedule for a room warming operation.

The conditions for operation and the temperature schedule are inputted by operating the main controller 19.

At Step 56, time key 28 is operated to set time. An input signal of time is received in the CPU 42 through the input unit 45 and at the same time, it is stored in the memory 43 and is displayed on the time indicator 27 throught the output unit 46. Then, time is indicated on the indicator 27 by the clock 44.

At Step 57, the operation mode key 22 is operated to set an operation mode with the result that one of the LEDs 23 to 26 is illuminated through the microcomputer 41. At step 58, the room key 30 is operated to select a room number, and the result of the selection is displayed at the left side on the temperature indicator 29 (in this embodiment, "3" is displayed for the room selected). At Step 59, keys 31 and 32 are operated to input the data of the set room temperature (reference temperature) for the room which is determined at Step 58.

Then, display is made at the left side from the center of the temperature indicator 29 (in this embodiment, "26° C." is displayed). At Steps 60–65, the keys 33 to 36 are operated to input a set back value for the set room temperature (inputted at Step 59) at each time of 0 o'clock to 24 o'clock, and the set back values are displayed on the temperature indicator 29 in a form of graph as shown in FIG. 2. When one of the keys 33 to 36 is operated, the set back value corresponding to the operated key is inputted for each unit of one hour and then, a set back value for the next one hour is inputted by operating any of the corresponding keys 33 to 36. The values on the surface of the keys 33 to 36 indicate the previously determined set back values Namely, the 0° C. key is used when a user wishes to maintain the set room temperature, the 2° C. key is used when he wishes to slightly modify the temperature to save energy or to care for his health, this key being used, for instance, when he is in bed, the 5° C. key is used when he wishes to frequently leave the room, to save energy and wishes to have the room temperature return to the room temperature as soon as possible when he enters in the room, and the 15° C. key is used when the room is left unoccupied. The 15° C. key may be used as an off-key and the sign of "OFF" may be used for "15° C.". The value inputted by operating any key is subjected to mode determination operation depending on the room cooling mode or the room warming mode at Step 62. If the room cooling mode is taken, a higher room temperature is automatically established (Step 64) and when the room warming mode is taken, a lower room temperature is automatically established (Step 64). An automatic change is carried out when the operation mode is switched during air-conditioning operations. On completion of the selective operation of the keys from 0 o'clock to 24 o'clock, the input key 37 is operated to store thus determined temperature schedule in the memory 43 at Step 66. The operations of the Steps 58 to 66 are done for all of the rooms (Step 67).

The various input data described above are stored in the memory 43, while data necessary to control the heat source device 17 and other devices are transmitted to the controlling apparatus 18 through the communication unit 47. When the user wishes to change the conditions of the operations, any keys may be operated to input the data corresponding to the operated keys to the controlling apparatus 18.

FIG. 7 shows an example of the temperature schedule determined by the conditions of a room. When a program is to be prepared for the temperature schedule, rough data are inputted in the consideration that the actual life is not always coincident with the programed life pattern and fine adjustment of the program may be done by operating the room controller 14 for each of the rooms. The room controller 14 is provided with the keys 39 and 40 which change the set room temperature (reference temperature) of the room.

The data inputted by operating the keys are transmitted to the CPU 49 (through the input unit 51 of the microcomputer 48) to be stored in the memory 50 and at the same time, the data are displayed on the temperature indicator 38 through the output unit 52. The data are also transmitted to the controlling apparatus 18 through the communication unit 53. The room temperature detector 54 detects the current room temperature and the detected room temperature is converted into a digital signal in the A/D transducer 55. The signal is inputted in the CPU 49 through the input unit 51 to be stored in the memory 50 and at the same time, it is transmitted to the controlling apparatus 18. The set temperature may be changed by operating either by the main controller 19 or by the room controller 14, in which the value given by either device which has been operated later is dominant The data on the set temperature stored in the memories 43 and 50 are simultaneously rewritten at each time when the set room temperature value is changed by the either device.

There are two ways to use the set back value when the set temperature is changed One way is to maintain the set back value (difference temperature) unchanged and it is shifted with change in the set room temperature. The other way is to increase or decrease the set back value depending on the increase or decrease of the set room temperature in which a temperature (the absolute temperature) initially set back is not changed Either way may be employed in the present invention.

In the first embodiment, the set back values are selected from the previously determined values in the temperature schedule by using the keys 33 to 36. However, it is feasible that the keys 33 and 34 are used as temperature keys, and the keys 35 and 36 are used as time keys so that the set back values can be determined as desired. In this case, more precise temperature schedule is possible Further, in the above-mentioned embodiment, a heat pump is used as the heat source device 17. However, for the heat source device, use of a gas furnace, the combination of a heat pump and a gas furnace, the combination of a heat pump and an electric heater, an air conditioner, the combination of an air conditioner and a gas furnace and the combination of an air conditioner and an electric heater may be considered.

For auxiliary devices used in combination with the heat source device, a humidifier, an air cleaner, a total heat exchanger and other devices are used The selecting switches used for these devices may be installed in the main controller 19 or the controlling apparatus 18.

For the combination of the main air duct 6 and the branch ducts 7, a chamber including a plurality of the dampers 9 may be attached to the outlet port of the room unit 2 and flexible ducts are extended to connect the chamber and the outlet ports 10.

The dampers 9 may be controlled in such a way that the degree of opening of each of the dampers is proportionally controlled depending on temperature difference between the room temperature and the set temperature so that air is blown out in correspondence to a heat load, or the dampers 9 are brought to two positions of entirely opening or entirely closing depending on the temperature difference.

In consideration of a service interruption, an electric charging type battery is provided for the microcomputer 41 in the main controller 19 so that the temperature schedule stored in the memory 43 is protected from the trouble at the service interruption. As another measures, the temperature schedule is stored in an EEPROM.

The controlling apparatus 18 may be provided with an HA terminal to allow the main controller 19 to operate through telephone from the outside of the house.

The main controller 19 may have an additional means to have room numbers correspond to the rooms. Namely, a cover plate is provided above the main controller 19 at a position where it is not in use, and the reverse side of the cover plate is attached with a table on which the names of the rooms corresponding to the room numbers are written.

In the first embodiment, description has been made as to the case that there are four rooms to be air-conditioned. For air conditioning the four rooms, a single main controller 19 and four room controllers 14 are used. However, the system of this embodiment may be so constructed as to have a single main controller including a room temperature detector which serves as a room controller and three room controllers 14. This system reduces the cost.

Thus, in the first embodiment of the present invention, the main controller of the air conditioning apparatus is provided with the operation mode changing means and, the temperature schedule inputting means, and the room controller is provided with the set temperature changing means, whereby the set temperature in the room can be changed by either of the controllers Accordingly, the operation of the controllers can be easily done and save energy.

Figure 9:
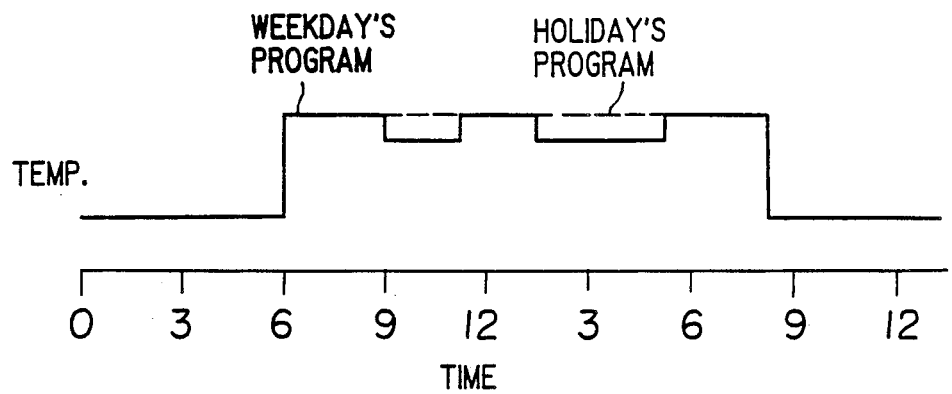
FIG. 9 is a diagram showing an example of a temperature schedule to be inputted in the main controller according to the second embodiment.

FIGS. 8 and 9 show the second embodiment of the present invention in which FIG. 8 is a front view of the main controller 19 and FIG. 9 is a diagram showing an example of the temperature schedule a holiday. The general construction of the second embodiment is similar to that of the first embodiment.

In FIG. 8, a reference numeral 76 designates a second operation mode key, a numeral 77 designates an LED for displaying holiday mode, which corresponds to the second operation mode key 76, and a numeral 78 designates a weekday key for determining a day of the week as a timer means. The time indicator 27 is adapted to indicate time and weekdays. The difference in the life pattern between the weekdays and holidays distinctly appears in the daytime and is small in the night. On a holiday, the program of the temperature schedule which is previously set and stored in the memory 43 is automatically corrected as shown by broken lines in FIG. 9. In times zones to be corrected (such as time from 6 o'clock to 18 o'clock, the set back value in the time is set to be 0° C. This seems to be contrary to an idea of saving energy. However, consideration is made so as not to impair comfortableness in a holiday in which residents often come in and go out the room. On a special holiday (e.g. national holidays) other than the weekend holidays, the operation mode key 76 is operated to set the holiday mode in the morning. By such operation, the set back value in the daytime is automatically corrected to be 0° C. as in the ordinary holidays. The holiday mode is automatically reset at 24 o'clock.

In accordance with the second embodiment, the main controller is provided with the operation mode changing means for changing operation modes including the holiday mode and the timer means so that the set back value in the day time of holidays is automatically corrected to be 0. Accordingly, comfortableness of a living condition in the holidays increases, and it is unnecessary to input an additional program for holidays.

Figure 10:
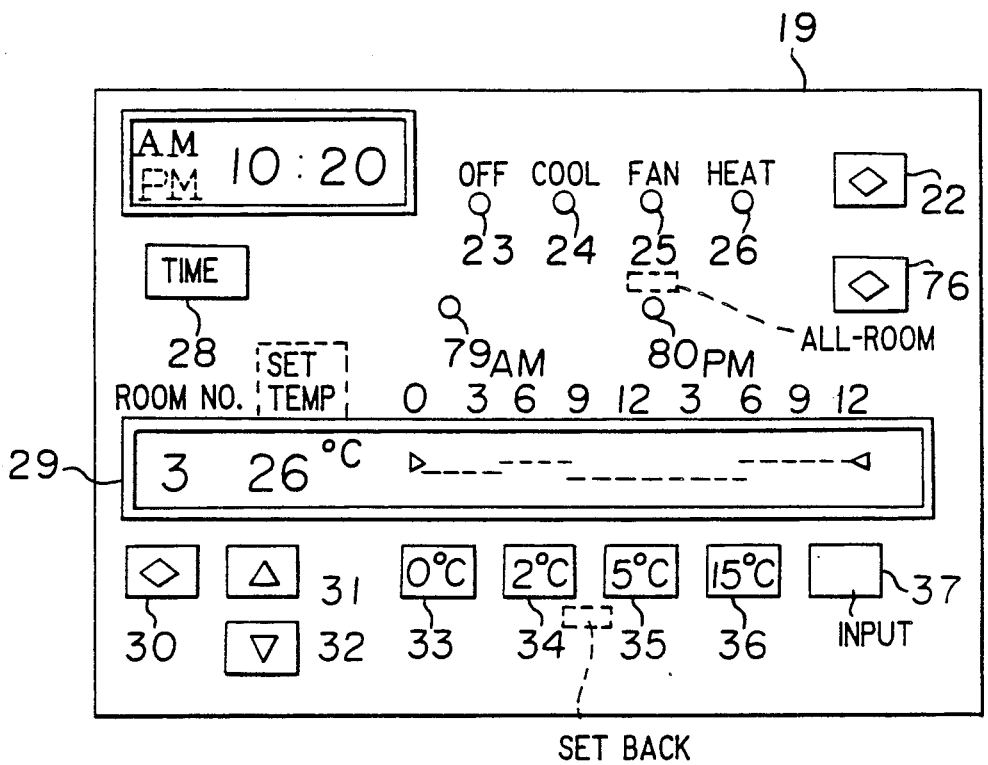
FIG. 10 is a front view of the main controller according to the third embodiment of the present invention.

FIG. 10 is a front view of a third embodiment of the main controller according to the present invention. The general construction of the controller is similar to that of the first embodiment.

In FIG. 10, a reference numeral 79 designates an LED for displaying a programed operation mode and a numeral 80 designates an LED for displaying an all-room operation mode, both of which are manually changed by operating an operation mode key 76.

The programed operation mode utilized in the third embodiment is same as the operation mode used in the first and second embodiments, and the all-room operation mode is such that the room temperature for all-rooms is controlled to be constant (the set back value is kept to be 0° C. in the all day long) at the set room temperature inputted by the keys 31, 32 or the keys 39, 40 regardless of the temperature schedule The all-room operation mode is preferably used in such a case that guests come in the rooms for a party and all of the rooms are to be air-conditioned. In this case, the set temperature for each of the rooms can be determined at desired temperatures.

Thus, in accordance with the third embodiment of the present invention, the main controller is provided with the operation mode changing means for changing operation modes including the programed mode and the all-room operation mode whereby all of the rooms are simultaneously air-conditioned. Accordingly, it is unnecessary to change the temperature schedule for all-room air-conditioning operation.

Figure 11:
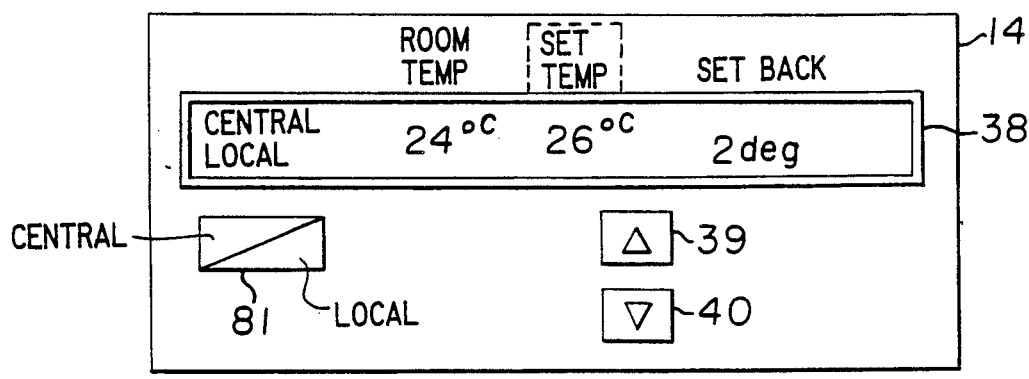
FIG. 11 is a front view of the room controller according to the fourth embodiment of the present invention.

FIG. 11 is a front view of the room controller according to the fourth embodiment of the present invention. In the Figure, the same reference numerals as in FIG. 3 designate the same parts. In FIG. 11, a numeral 81 designates a central/local key as a central/local operation selecting means The temperature indicator 38 indicates the central operation mode or the local operation mode which is currently carried out. A resident operates a key as desired to select either of the modes.

The central operation mode is the same as the programed operation mode as in the first and second embodiments. The local operation mode is manually effected and is to control the room temperature of a room at a constant level at the set room temperature inputted by the keys 31, 32 or the keys 39, 40 (the set back value for the room is corrected to be 0° C.) regardless of the temperature schedule Use of the local operation mode provides the optimum condition of air conditioning of the room without changing the temperature schedule of the main controller 19 when a resident enters in the room in the time zone having a set back value according to the program inputted by the main controller 19.

Figure 12:
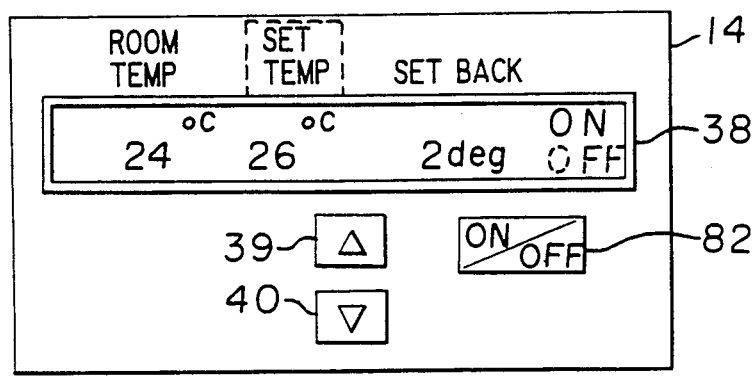
FIG. 12 is a front view of the room controller according to the fifth embodiment of the present invention.

In the fourth embodiment of the present invention, the room controller is provided with the central/local mode selecting means so that the room temperature of a room is controlled to be a constant level regardless of the temperature schedule during the local operation mode. Accordingly, when a resident enters in the room in an programed time zone, the room temperature can be easily brought to the set room temperature FIG. 12 is a front view of the room controller of the fifth embodiment according to the present invention. In the Figure, the same reference numerals as in FIG. 3 designate the same parts In FIG. 12, a reference numeral 82 designates an ON/OFF key as an operation/stop selecting means. The temperature indicator 38 indicates ON mode or OFF mode which is currently carried out. Selection of these mode can be made by a resident The ON mode is a programed operation mode which is same as the foregoing embodiments The OFF mode is one which possibly stops air-conditioning of the room regardless of the temperature schedule The OFF mode is operated when a resident wishes to save energy or goes out the room. The ON/OFF key may be used such a manner that the set back value for each of the rooms is set to be 0° C. for the all day long, and when a resident enters in the room, the key 82 is operated to bring the condition into the ON mode, and when he goes out the room, the key 82 is operated into the OFF mode In the fifth embodiment of the present invention, the room controller is provided with the operation/stop selecting means so that a resident can stop the air-conditioning of the room when he goes out. Accordingly, an advantage of energy-saving is large.

What is claimed is:
1. An air conditioning apparatus comprising:
means for producing temperature controlled air including a heat source device and a heat exchanger device connected to said heat source;
means for delivering said temperature controlled air to each of a plurality of rooms, said means for delivering including an air-blower placed in the vicinity of said heat exchanger and air-duct system containing said heat exchanger and said air-blower wherein said air-duct system distributes said air from said heat exchanger to said plurality of rooms;
a plurality of air quantity adjusting dampers each of which is associated with a respective one of said rooms in order to regulate the air quantity fed to each of said rooms;
a controlling apparatus for controlling said dampers, said heating source device and said air-blower;
a main controller connected to said controlling apparatus;
a room controller provided in each of said rooms including a room temperature detector which is connected to said controlling apparatus, wherein:
said main controller is further provided with an operation mode changing means for changing operation modes including a holiday mode wherein said operation mode changing means provides a set back value for a daytime zone which is a zero setback value when a signal indicative of said holiday mode is input to said operation mode changing means during a predetermined portion of a 24 hour period to create a holiday mode and wherein said holiday mode is automatically reset at the end of said 24 hour period, said main controller further including a temperature schedule inputting means for controlling the temperature of each of said rooms independently of each other in accordance with a program and a timer means for determining the time and day of the week; and
wherein said room controller is provided with a set room temperature changing means for changing a set room temperature of only its associated room.
2. The air conditioning apparatus according to claim 1, wherein said timer means automatically corrects a set back value for a daytime zone to be zero during weekend days.

* * * * *